United States Patent
Asthana

(10) Patent No.: US 9,483,218 B2
(45) Date of Patent: Nov. 1, 2016

(54) NETWORK PRINTING

(71) Applicant: HEWLETT-PACKARD DEVELOPMENT COMPANY, L.P., Houston, TX (US)

(72) Inventor: Prashant Asthana, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/771,541

(22) PCT Filed: Mar. 29, 2013

(86) PCT No.: PCT/US2013/034615
§ 371 (c)(1),
(2) Date: Aug. 31, 2015

(87) PCT Pub. No.: WO2014/158189
PCT Pub. Date: Oct. 2, 2014

(65) Prior Publication Data
US 2016/0054961 A1    Feb. 25, 2016

(51) Int. Cl.
G06F 3/12      (2006.01)
H04L 29/08    (2006.01)

(52) U.S. Cl.
CPC .......... *G06F 3/1236* (2013.01); *G06F 3/1203* (2013.01); *G06F 3/1231* (2013.01); *G06F 3/1288* (2013.01); *H04L 67/00* (2013.01); *H04L 67/18* (2013.01)

(58) Field of Classification Search
CPC .. G06F 3/1236; G06F 3/1203; G06F 3/1231; G06F 3/1288; H04L 67/18; H04L 67/00
USPC .............................................. 358/1.13, 1.15
See application file for complete search history.

(56) References Cited

U.S. PATENT DOCUMENTS

| | | | |
|---|---|---|---|
| 6,924,906 B1 | 8/2005 | Schwier et al. | |
| 7,050,184 B1* | 5/2006 | Miyamoto | H04N 1/00127 358/1.13 |
| 7,215,437 B2 | 5/2007 | Shima | |
| 7,298,508 B2 | 11/2007 | Furukawa et al. | |
| 7,315,889 B2 | 1/2008 | Ono et al. | |
| 7,400,424 B2 | 7/2008 | Parry | |
| 7,545,822 B2* | 6/2009 | Fukunaga | H04L 12/40052 370/257 |
| 7,710,593 B2* | 5/2010 | Kamijima | H04N 1/32128 101/484 |
| 7,911,978 B1* | 3/2011 | Chandra | H04L 41/12 370/255 |
| 8,204,963 B2 | 6/2012 | Shima | |
| 2004/0162870 A1 | 8/2004 | Matsuzaki et al. | |
| 2005/0238401 A1 | 10/2005 | Yamada et al. | |

(Continued)

OTHER PUBLICATIONS

International Searching Authority, International Search Report & Written Opinion, Dec. 26, 2013, 13 pages.

(Continued)

*Primary Examiner* — Allen H Nguyen
(74) *Attorney, Agent, or Firm* — HP Inc Patent Department

(57) ABSTRACT

Systems and methods for printing a document over a network are described herein. In one implementation, a method for network printing comprises receiving a request from a node to connect to a parent node and determining whether a number of child nodes of the parent node has reached a predefined threshold number. The method further comprises transmitting a connection acknowledgement message to the node on determining the number of child nodes not to have reached the predefined threshold number.

9 Claims, 8 Drawing Sheets

(56) References Cited

U.S. PATENT DOCUMENTS

| | | | |
|---|---|---|---|
| 2009/0125611 A1* | 5/2009 | Barsness | H04L 67/34 |
| | | | 709/220 |
| 2010/0315680 A1 | 12/2010 | Ishikake | |
| 2012/0062946 A1 | 3/2012 | Kietagata | |
| 2012/0185508 A1* | 7/2012 | Shah | G06F 17/30958 |
| | | | 707/780 |

OTHER PUBLICATIONS

Peter Saint-Andre et al., XMPP: The Definitive Guide—Building Real-Time Applications with Jabber Technologies, Apr. 2009, First Edition, pp. 1-306, O'Reilly Media, Inc., Available at: <oriolrius.cat/blog/wp-content/uploads/2009/10/Oreilly.XMPP.The.Definitive.Guide.May.2009.pdf>.

* cited by examiner

NETWORK PRINTING

BACKGROUND

The advent of communication networks has greatly enhanced the availability of shared resources to the users. One category of shared resources, used extensively over communication networks is that of network printers. The network printers facilitate multiple users to print documents, over the communication network, without having to install a printer driver on their computing systems.

Recently developed technologies facilitate printing using an electronic mail (e-mail) system instead a computing system. In such cases, each printer is identified using a unique e-mail address. The printers are usually connected to a print server over the communication network. In operation, the users send a print job by sending an e-mail to the print server. The print server scans the e-mail for detecting the presence of viruses and spam. The scanned e-mail, along with its attachments is then forwarded to the printer, which is identified based on the e-mail address for printing. The printers can also connect to the user's computing systems to send data, such as to send a scanned copy of a document.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
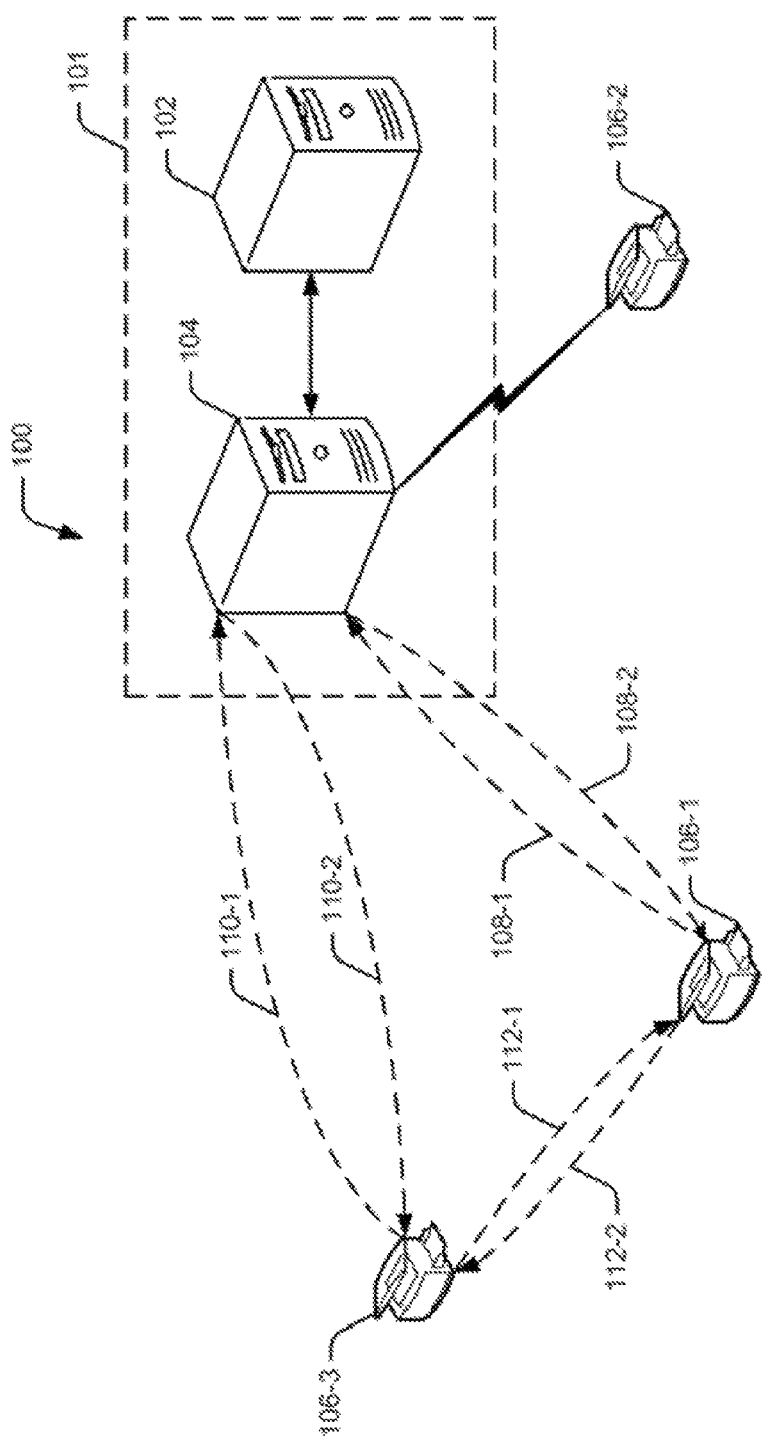
FIG. 1a schematically illustrates a network environment including a network printing system, according to an example of the present subject matter.

The present subject matter relates to systems and methods for network printing. The methods and systems as described herein may be implemented using various commercially available computing systems and printers.

Generally, the printers implementing network printing techniques, such as ePrint and AirPrint, remain online and connected to a print server. However, for a major portion of time, most of the printers are idle or in an inactive state and only a small portion of the connected printers are active, i.e., only a small portion of the connected printers execute a print job. The inactive printers, which remain connected, increase the number of Extensible Messaging and Presence Protocol (XMPP) connections that have to be maintained by the print server, and thereby increase the load on the print server.

In case of a glitch in the print server, all the printers connected to that print server attempt to reconnect with the print server or connect to a different print server which functions as an alias. This creates a connection wave which significantly increases the load on the print server and enhances the probability of failures in the operation of the print server.

Further, most of the service providers of network printing techniques have their print servers in data centers located at particular geographical areas where there is availability of communication bandwidth and power at low costs. Thus, printers located in far off geographical areas have to cross multiple network hops to connect with the print sewer. This increases the load on the communication network.

Commercially available techniques for improving the efficiency of systems implementing network printing techniques involve increasing the number of print servers so as to provide an optimal 'number of printers per print server'. However, increasing the number of print servers increases the expenditure for the service provider which in turn is recovered from the sale of the printer. Thus, the cost of printers implementing these network printer techniques increases which reduces the popularity of the printers amongst users.

The systems and methods, described herein, implement techniques of network printing. In one example, the method of network printing is implemented using a print server and a signaling server. The print server and the signaling server may be implemented as any computing device, such at personal computers, workstations, network servers and servers. In one implementation, the signaling server and the print server are communicatively coupled to each other.

In one example, a tree structure is formed using the interact protocol (IP) address of the signaling server and the printers as nodes. In said example, the signaling server acts as the root node. Some printers are then directly connected to the signaling server and are referred to as the child nodes of the signaling server. Further, certain printers can then connect to the directly connected printers. The directly connected printers can then act as patent nodes for the certain printers.

In operation, whenever a printer sends a connection request to the signaling server. The signaling server verities whether the number of printers directly connected to it has reached a pre-defined threshold number. In case, the pre-defined threshold number has not been reached, tide signaling server transmits a connection acknowledgement message to the printer and establishes a connection with the first printer. The connection acknowledgement message may be a response sent by the signaling server indicating that the signaling server is ready to establish a communication channel with the printer. The connection acknowledgement message may also indicate the port of the signaling server to which the printer should connect. For explanation, it is assumed that the signaling server supports a maximum of four printers directly connected to it. On receiving a connection request from a fifth printer, the signaling server transmits a list of printers directly connected to it, i.e., a list of the signaling server's child nodes. In one example, the signaling server maintains a list of internet protocol (IP) addresses of its child nodes and transmits the list to the fifth printer. The list may also indicate the geographical location of the child nodes.

The fifth printer then attempts to establish a connection with any of the child nodes of the signaling server, such as the first printer. In one example, the fifth printer may attempt to establish a connection with the child nodes of the signaling server in an ascending order of the geographical distance of the child node from the fifth printer. For explanation, it is assumed that the fifth printer attempts to connect with the first printer.

On receiving the connection request, the first printer verifies whether the number of printers directly connected to it has reached a pre-defined threshold number. In case, the pre-defined threshold number has not been reached, the first printer transmits a connection acknowledgement message to the fifth printer and establishes a connection with the fifth printer. The first printer also transmits a list of its peer nodes, i.e., a list of printers directly connected with the signaling server, to the fifth printer. The list of peer nodes may also indicate the geographical location of the peer nodes. This facilitates the fifth printer to establish a connection with the nearest peer node of the first printer in case of a break in connection with the first printer.

Once the first printer is directly connected with the pre-defined threshold number of other child nodes, i.e., printers, the first printer, on receiving a request from a new printer, transmits a list of its child nodes to the new printer. On establishing a connection with one of the child nodes of the first printer, the new printer transmits the address of the printer, to which the new printer is connected, to the signaling server. In one example, the signaling server maintains an IP index of IP addresses of the printers connected directly or indirectly to the signaling server. The IP index facilitates the signaling server to perform route data to a particular printer.

On the print server receiving a print job to be executed by a particular printer, the print server transmits a request to the signaling server for establishing a connection with the particular printer. The signaling server routes the request to the particular printer based on the IP index. The particular printer then sends a connection request to the print server for direct connection. On the direct connection being established, the print server transmits the print job to the particular printer for execution. On completion of the print job, the print server terminates the direct connection.

Thus, the systems and methods described herein, facilitate network printing using a reduced number of print servers as only the printers which have to execute a print job shall be connected to the print server. Further, in case of a glitch on one of the nodes, only the child nodes of the affected node, shall attempt to reconnect with the affected node or with the peer nodes of the affected node. This significantly reduces the number of reconnection requests. Further, since most of the nodes will be connected to a parent node and child nodes of nearby geographical region, the number of hops wilt be reduced, thereby reducing the load on the communication network.

The above systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and methods for network printing are implemented shall be explained in details with respect to FIGS. 1 to 5. While aspects of described systems and methods for network printing can be implemented in any number of different computing systems, environments and/or configurations, the examples and implementations are described in the context of the following system(s).

FIG. 1a schematically illustrates a network environment 100 including a network printing system 101, according to an example of the present subject matter. In one example, the network printing system 101 further includes a print server 102 and a signaling server 104. The print server 102 and the signaling server 104 may be implemented in various commercially available computing systems, such as servers, network servers, workstations and personal computers. The signaling server 104 is communicatively coupled with the print server 102.

The network environment 100 further includes a plurality of printers, such as the printer 106-1, the printer 106-2 and the printer 106-3. The printers 106-1, 106-2 and 106-3 are collectively referred to as the printers 106 and singularly as the printer 106. The printer 106 may be implemented as a variety of printers, such as a office printer, a large format printer, an inkjet printer, a laser printer and a multi function printer. The printer 106 is usually associated with an e-mail address and includes interfaces which facilitate the printer 106 to connect with other computing systems and computer peripherals either directly or over a communication network. In one example, the printers 106 may implement various techniques of network printing, such as ePrint and AirPrint.

In one implementation, a printer 106-1 may send a connection request, indicated by arrow 108-1, to the signaling sever 104. On receiving the connection request, the signaling server 104 verifies whether the number of printers 106 directly connected to it has reached a pre-defined threshold number. In one example, the pre-defined threshold number may be defined by an administrator of the signaling server 104 based on the technical specification of the signaling server 104.

In case, the pre-defined threshold number has not been reached, the signaling server 104 transmits a connection acknowledgement message, indicated by arrow 108-2 to the printer 106-1 and establishes a connection with the printer 106-1. In one implementation, the connection between the printer 106-1 and the signaling server 104 may be in accordance with TCP/IP protocol. For explanation, it is assumed that the signaling server 104 supports a maximum of two printers directly connected to it. Thus, the connection request from the printer 106-2 shall also be accepted by the signaling server 104 in a similar manner as described above.

When the printer 106-3 sends a connection request, indicated by arrow 110-1, the signaling server 104 determines that the number of printers 106, directly connected to it, has reached the pre-defined threshold number. The signaling server 104 then transmits, as indicated by arrow 110-2, a list of child nodes, i.e., the printers 106-1 and 106-2, directly connected with the signaling server 104. The list of child nodes may include the IP addresses of the printers 106- and 106-2, and the geographical location of each of the child nodes. In one example, the printer 106-3 may attempt to connect with any of the child nodes of the signaling server 104 in a random order. In another example, the printer 106-3 may attempt to establish a connection with the child nodes of the signaling server in an ascending order of the geographical distance of the child node from the printer 106-3. For explanation, it is assumed that the printer 106-1 is geographically closer to the printer 106-3.

On receiving the connection request, indicated by arrow 112-1, from the printer 106-3, the printer 106-1 verities whether the number of printers 106, directly connected to it, i.e., the number of child nodes of the printer 106-1, has reached a pre-defined threshold number. In case, the pre-defined threshold number has not been reached, the printer 106-1 transmits a connection acknowledgement message, indicated by arrow 112-2, to the printer 106-3 and establishes a connection with the printer 106-3. In one implementation, the connection amongst the printers 106 may be based on peer to peer (P2P) protocol. The printer 106-1 also transmits a list of its per nodes, i.e., a list of printers 106, directly connected with the signaling server 104, to the printer 106-3. The list of peer nodes may also indicate the geographical location of the peer nodes.

Once any of the printers 106 is directly connected with the pre-defined threshold number of child nodes, the printer 106 on receiving a request from a new printer 106, transmits a list of its child nodes to the new printer 106. On establishing a connection with one of the child nodes of the first printer 106, the new printer 106 transmits the address of its parent node to the signaling server 104.

In one example, the signaling server 104 may maintain an IP index of IP addresses of the printers 106 connected directly or indirectly to the signaling server 104. The IP index facilitates the signaling server 104 to perform route data to a particular printer 106.

Thus, the signaling system 104 facilitates generating and internet protocol (IP) tree of printers 106 connected directly or indirectly with the signaling server. The IP tree may be implemented as a data structure that simulates a hierarchical tree structure with a set of linked nodes. In one example, the signaling server 104, represented by its IP address, may be the root node. The root node may be connected to one or more printers 106, represented by their IP addresses. The IP tree is explained in greeter detail in conjunction with FIG. 1*b*.

Figure 1B:
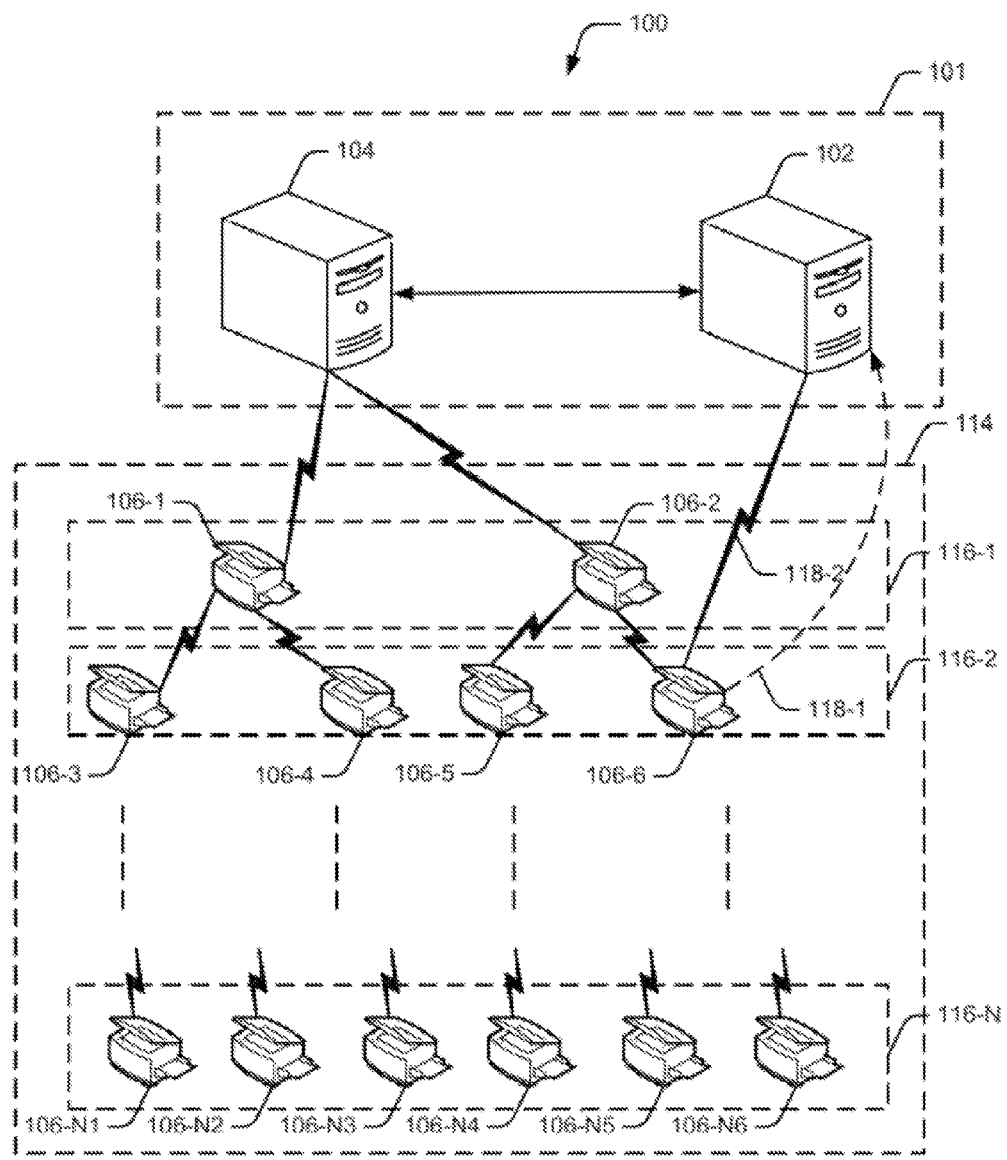
FIG. 1b schematically illustrates the network environment including the network printing system, according to another example of the present subject matter.

FIG. 1*b* schematically illustrates the network environment 100 including the network printing system 101, according to another example of the present subject matter. As mentioned earlier, the signaling server 104 generates an IP tree 114. The IP tree 114 includes the printers 106 which are connected at different levels. For example, the printers 106-1 and 106-2 are connected directly to the signaling sewer 104 and form the first level 116-1 of the IP tree 114. The printers 106 which are a part of the first level 116-1 may be referred to as primary nodes. Similarly the printers 106-3, 106-4, 106-5 and 106-6 which are connected to one of the primary nodes of the IP tree 114 form the second level 116-2 of the IP tree 114. The printers 106 which are a part of the first level 116-1 may be referred to as secondary nodes.

In one example, the IP tree 114 may comprise of any number, represented by N, of levels. The Nth level 116-N may include any number of printers, represented by M. The printers 106 which are at a same level of the IP tree 114 are referred to as peer nodes. Each printer 106 at the $N^{th}$ level is connected to one printer 106 which is at $(N-1)^{th}$ level. The connected printer 106 at the $(N-1)^{th}$ level is referred as the parent node of the printer 106 at the $N^{th}$ level. Similarly, each printer 106 at the $N^{th}$ level may be connected to one or more printers 106 which is at $(N+1)^{th}$ level. The connected printers 106 at the $(N+1)^{th}$ level is referred as the child nodes of the printer 106 at the $N^{th}$ level.

In one example, the signaling server 104 may restrict the depth of the IP tree 114 to a predefined number of levels 116. Further, the signaling system 104 may restrict the number of peer nodes to a predefined number at each level 116 of the IP tree 114.

In operation, on the print server 102 receiving a print job to be executed by a particular printer, such s the printer 106-6, the print server 102 transmits a direct connection request with the printer 106-6 to the signaling server 104. The signaling server 104 may implement various processes of modifying IP address information, such as network address translation (NAT), in IP packet headers of the direct connection request to route the direct connection request to the printer 106-6. The printer 106-6 then sends a connection request, denoted by 118-1, to the print server 102, for direct connection. On the direct connection, indicated by communication channel 118-2, being established the print server 102 transmits the print job to the printer 106-6 for execution. On completion of the print job, the print server 102 terminates the communication channel 118-2.

Thus, the network printing system 101, described herein, facilitate network printing using a reduced number of print servers 102. Further, in case of a glitch on one of the nodes, only the child nodes of the affected node, shall attempt to reconnect with the affected node or with the peer nodes of the affected node. This significantly educes the number of reconnection requests.

Figure 2A:
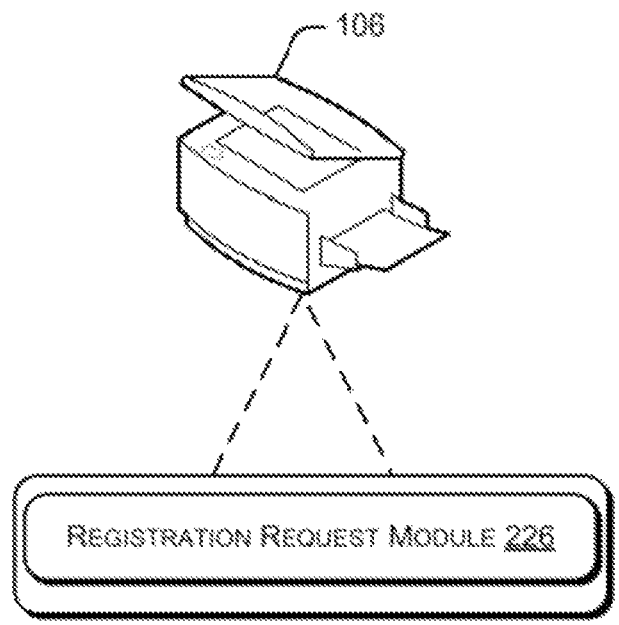
FIG. 2a schematically illustrates the components of a printer 106, according to an example of the present subject matter.

FIG. 2*a* schematically illustrates the components of a printer 106, according to an example of the present subject matter. In one example, the printer 106 includes a processor (not shown in figure) and a registration request module 226 communicatively coupled to the processor. In said example, the registration request module 226 transmits a connection request to a parent node. The parent node may be the signaling server 104 or another printer 106. In response to the connection request, the registration request module 226 may receive a connection acknowledgement message or a list of child nodes, of the parent node.

On receiving, the connection acknowledgement message, the; registration request module 226 establishes a connection with the parent node. If the connection acknowledgement message is not received, the registration request module 226 transmits the connection request to at least one of the child nodes, of the parent node. The working of the printer 106 is explained in greater detail in conjunction with FIG. 2*b*.

Figure 2B:
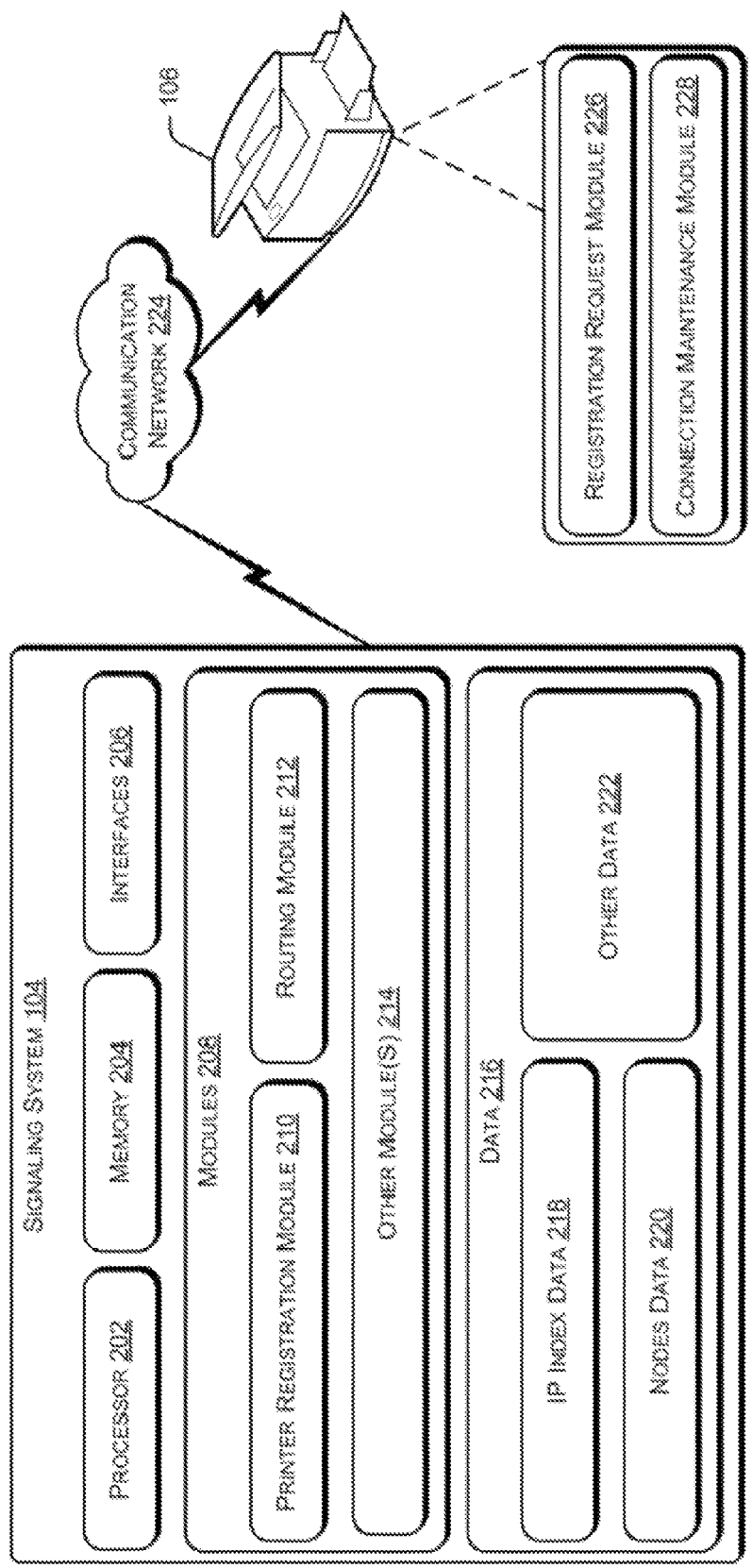
FIG. 2b schematically illustrates the components of a signaling server and a printer, according to another example of the present subject matter.

FIG. 2*b* schematically illustrates the components of the signaling server 104 and the printer 106, according to another example of the present subject matter.

In one implementation, the signaling server 104 includes a processor 202, and a memory 204 connected to the processor 202. The processor 202 may include microprocessors, microcontrollers, and logic circuitries. Among other capabilities, the processor 202 may fetch and execute computer-readable instructions stored in the memory 204.

The memory 204, communicatively coupled to the processor 202, can include any non-transitory computer-readable medium known in the art including, volatile memory and nonvolatile memory, such as read only memory (ROM), flash memories, hard disks, optical disks, and magnetic tapes.

Further the signaling server 104 includes interfaces 206. The interfaces 206 may include a variety of commercially available interfaces, for example, interfaces for peripheral device(s), such as data input output devices, referred to as I/O devices, storage devices, network device. The interfaces 206 facilitate the communication of the signaling server 104 with various communication and computing devices and various communication networks such as networks that use a variety of protocols, for example, Hypertext Transfer Protocol (HTTP), Extensible Messaging and Presence Protocol (XMPP) and Transmission Control Protocol/Internet Protocol (TCP/IP).

Further, the signaling server 104 may include modules 208. The modules 208 may be coupled to the processor 202.

The modules 208, amongst other things, include routines, programs, objects, components, data structures, etc., which perform particular tasks or implement particular abstract data types. The modules 208 may also be implemented as, signal processor(s), state machine(s), logic circuitries, and/or any other device or component that manipulate signals based on operational instructions.

Further, the modules 208 can be implemented in hardware, computer-readable instructions executed by a processing unit, or by a combination thereof. In said implementation, the modules 208 include a printer registration module 210, a routing module 212 and other module(s) 214. The other module(s) 214 may include programs or coded instructions that supplement applications or functions performed by the signaling server 104.

In an example, the signaling server 104 includes data 216. In said implementation, the data 216 may include IP index data 218. Nodes data 220 and other data 222. The other data 222 may include data generated and saved by the modules 208 for providing various functionalities of the signaling server 104.

In one implementation, the signaling server 104 is communicatively coupled to the printers 106 over a communication network 224. The communication network 224 may include any commercially available telecommunication network and improvements thereon, or any of the public communication networks that use any of the commonly used protocols, for example, Hypertext Transfer Protocol (HTTP) and Transmission Control Protocol/Internet Protocol (TCP/IP). In one example, the printer 106 includes the registration request module 226 and a connection maintenance module 228.

In operation, the registration request module 226 of the first printer 106 may send a connection request to the signaling server 104 over the communication network 224. The printer registration module 210 receives the request and determines whether the signaling sewer 104 is already connected with the pre-defined threshold number of printers 106. In case, the printer registration modulo 210 transmits a connection acknowledgement message to the printer 106 and establishes a connection with the printer 106. Further, the routing module stores the IP address of the printer 106 as IP index data 218. Thereafter, the printer registration module 210 accepts connection requests till the signaling server 104 is connected to the pre-defined threshold number of printers 106.

If a $N^{th}$ printer 106 transmits a connection request after the signaling server 104 is connected to the pre-defined threshold number of printers 106, the printer registration module 210 transmits a list of the IP addresses of its child nodes. Thereafter, the registration request module 226 of the $N^{th}$ printer 106 sends a connection request to the child nodes of the signaling server 104 in an ascending order of the geographical distance of the child node from the $N^{th}$ printer 106. For the sake of explanation, it is assumed that the first printer 106 is geographically closest to the $N^{th}$ printer 106.

On receiving the connection request from the $N^{th}$ printer 106, the connection maintenance module 228 verifies whether the number of first printer 106 has reached the pre-defined threshold number. In case, the pre-defined threshold number has not been reached, the connection maintenance module 228 of the first printer 106 transmits a connection acknowledgement message to the $N^{th}$ printer 106 and establishes a connection with the $N^{th}$ printer 106. The connection maintenance module 228 of the first printer 106 also transmits a list of its peer nodes to the $N^{th}$ printer 106.

In one example, connection maintenance module 228 of each printer may transmit the IP addresses of its parent node and child nodes to the routing module 212 of the signaling server 104. The routing module 212 may store the same as IP index data 218 to route data to any particular printer 106.

On receiving a print job to be executed by a particular printer, the print server 102 transmits a direct connection request with the printer 106 to the routing module 212 of the signaling server 104. The routing module 212 may implement various processes of modifying IP address information in IP packet headers of the direct connection request to route the direct connection request to the printer 106. The registration request module 226 of printer 106 then sends a connection request to the print server 102 for direct connection. On the direct connection being established, the print server 102 transmits the print job to the printer 106 for execution. On completion of the print job, the connection maintenance module 228 terminates the communication channel 108-2

Thus, the signaling server 104 facilitate network printing using a reduced number of print servers 102 as only the printers 106 which have to execute a print job shall be connected to the print server 102. Further, in case of a glitch on one of the nodes, only the child nodes of the affected node, shell attempt to reconnect with the affected node or with the peer nodes of the affected node. This significantly reduces the number of reconnection requests.

Figure 3:
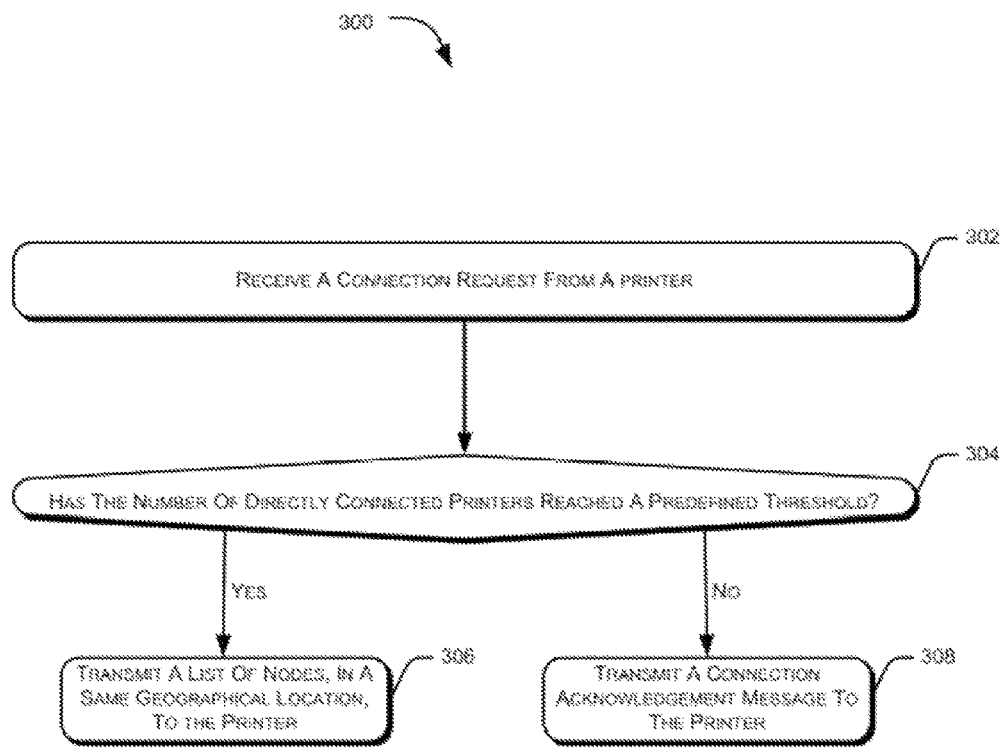
FIG. 3 illustrates a method for network printing, according to an example of the present subject matter.
Figure 4:
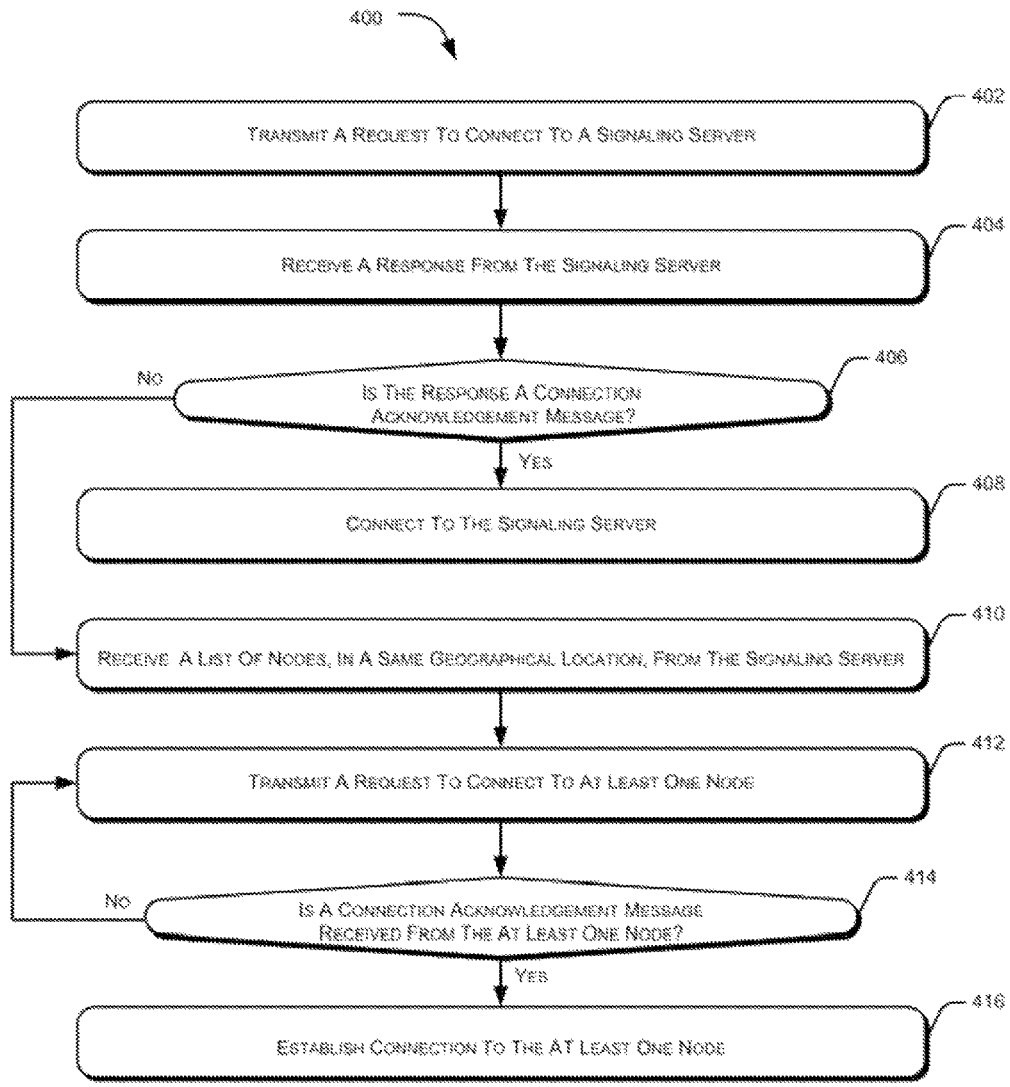
FIG. 4 illustrates a method for network printing, according to another example of the present subject matter.
Figure 5:
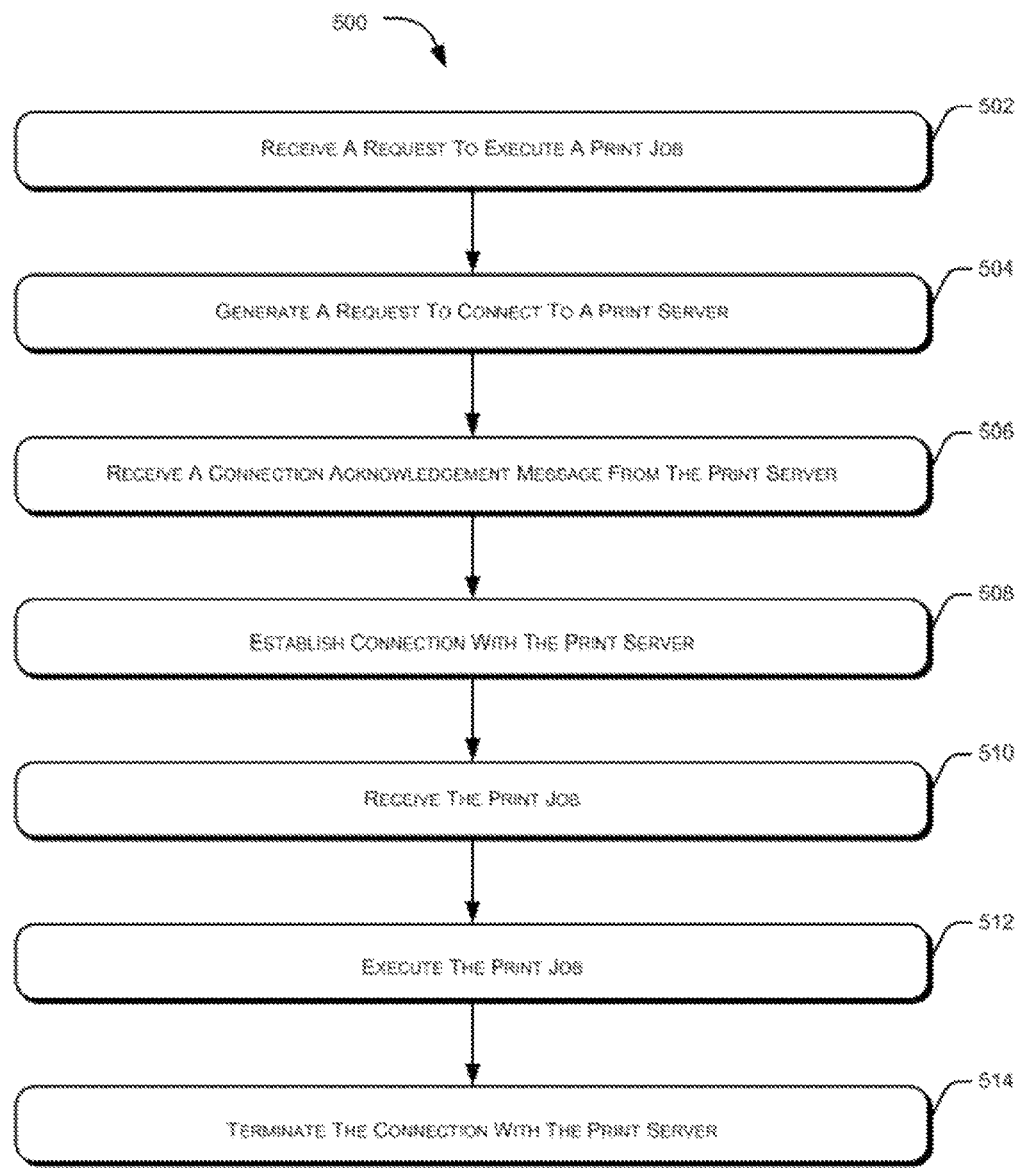
FIG. 5 illustrates a method for network printing, according to another example of the present subject matter.

FIG. 3 illustrates a method 300 for network printing, according to an example of the present subject matter. FIG. 4 illustrates a method 400 for network printing, according to another example of the present subject matter. FIG. 5 illustrates a method 500 for network printing, according to another example of the present subject matter. The order in which the methods 300, 400 and 500 are described is not intended to be construed as a limitation, and any number of the described method blocks can be combined in any order to implement the methods 300, 400 and 500, or an alternative method. Additionally, individual blocks may be deleted from the methods 300, 400 and 500 without departing from the spirit and scope of the subject matter described herein. Furthermore, the methods 300, 400 and 500 may be implemented in any suitable hardware, computer-readable instructions, or combination thereof.

The steps of the methods 300, 400 and 500 can be performed by programmed computers. Herein, some examples are also intended to cover program storage devices, for example, digital data storage media, which are machine or computer readable end encode machine-executable or computer-executable programs of instructions, where said instructions perform some or all of the steps of the described methods 300, 400 and 500. The program storage devices may be, for example, digital memories, magnetic storage media, such as a magnetic disks and magnetic tapes, hard drives, or optically readable digital data storage media.

With reference to method 300 as depicted in FIG. 3, as depicted in block 302, a connection request is received from the printer 106. In one implementation, the printer registration module 210 of the signaling server 104 receives the connection request from the printer 106. In another example, the connection maintenance module 228 of the printer 106 receives the connection request from another printer 106.

At block 304, it is determined whether the number of directly connected printers has reached a predefined threshold number. In one implementation, the printer registration module 210 of the signaling server 104 determines the number of child nodes, i.e., printers 106, connected to the signaling server 104. In another example, the connection maintenance module 228 of the printer 108 determines the number of child nodes of the printer 106.

If at block 304 it is determined that the number of directly connected printers has reached a predefined threshold number, then as illustrated at 306, a list of child nodes in a same or nearby geographical location, is transmitted to the printer 106. In one implementation, the printer registration module 210 of the signaling server 104 transmits the list of child nodes to the printer 106.

If at block 304, it is determined that the number of directly connected printers has not reached a predefined threshold number, then, as illustrated at 308, a connection acknowledgement message is transmitted to the printer 106. In one example, the printer registration module 210 of the signaling server 104 transmits the connection acknowledgement message to the printer 106 and establishes a communication channel between the printer 106 and the signaling server 104.

With reference to method 400 as depicted in FIG. 4, as depicted in block 402, a request to connect to the signaling server 104 is transmitted by the printer 106. In one implementation, the registration request module 226 of the printer 106 may generate and transmit the request to the signaling server 104.

As illustrated in block 404, a response is received from the signaling server 104. In one example, the connection maintenance module 228 received the response from the signaling server 104.

At block 406, it is determined whether the response is a connection acknowledgement message. In one implementation, the connection maintenance module 228 determines whether the response is a connection acknowledgement message.

If at block 406, the response is determined to be a connection acknowledgement message, then, as depicted in block 408, the printer 106 connects to the signaling server 104. In one implementation, the connection maintenance module 228 establishes connection with the signaling server 104.

If at block 406, the response is determined not to be a connection acknowledgement message, then, as depicted in block 410, the printer 106 receives a list of child nodes or peer nodes, in a same or nearby geographical location, from the signaling server 104. In one implementation, the connection maintenance module 228 received the list of child nodes end peer nodes from the signaling server 104.

As shown in block 412, a request to connect to at least one of the nodes in the list is transmitted by the printer 106. In one implementation, the registration request module 226 transmits the request to connect to at least one of the nodes in the list in a random order. In another implementation, the registration request module 226 transmits the request to connect to at least one of the nodes in the list in an ascending order of geographical distance between the printer 106 and the node.

At block 414, it is determined whether a connection acknowledgement message is received from the at least one node. In one implementation, the connection maintenance module 228 determines whether a connection acknowledgement message has been received from the at least one node.

If at block 414, the connection acknowledgement message is received then, as illustrated in block 416, a connection is established with the at least one node. In one example, the connection maintenance module 228 establishes the connection with the at least one node.

If at block 414, the connection acknowledgement message is not received then, as illustrated in block 412, a request to connect to at least one of the nodes in the list is transmitted by the printer 106.

With reference to method 500 as depicted in FIG. 5, as depicted in block 502, a request to execute a print job is received by the printer 106. In one implementation, the print server 102 transmits the request to perform the print job to the signaling server 104. The routing module 212 of the signaling server 104 routes the request to the printer 106.

As illustrated in block 504, a request to connect to a print server 102 is requested by the printer 106. In one implementation, the connection maintenance module 228 of the printer 106 generates the request to connect to the print server 102.

As shown in block 506, a connection acknowledgement message is received from the print server 102. In one example, the connection maintenance module 228 receives the connection acknowledgement message from the print server 102.

At block 508, a connection with the print server 102 is established. In one implementation, the connection maintenance module 228 establishes a communication channel with the print server 102.

As depicted in block 510, the print job is received. In one example, the connection maintenance module 228 receives the print job from the print server 102.

As illustrated in block 512, the print job is executed. As depicted in block 514, the connection with the print server 102 terminated. In one implementation, the connection maintenance module 228 terminates the connection with the print server 102 on completion of the execution of the print job.

Figure 6:
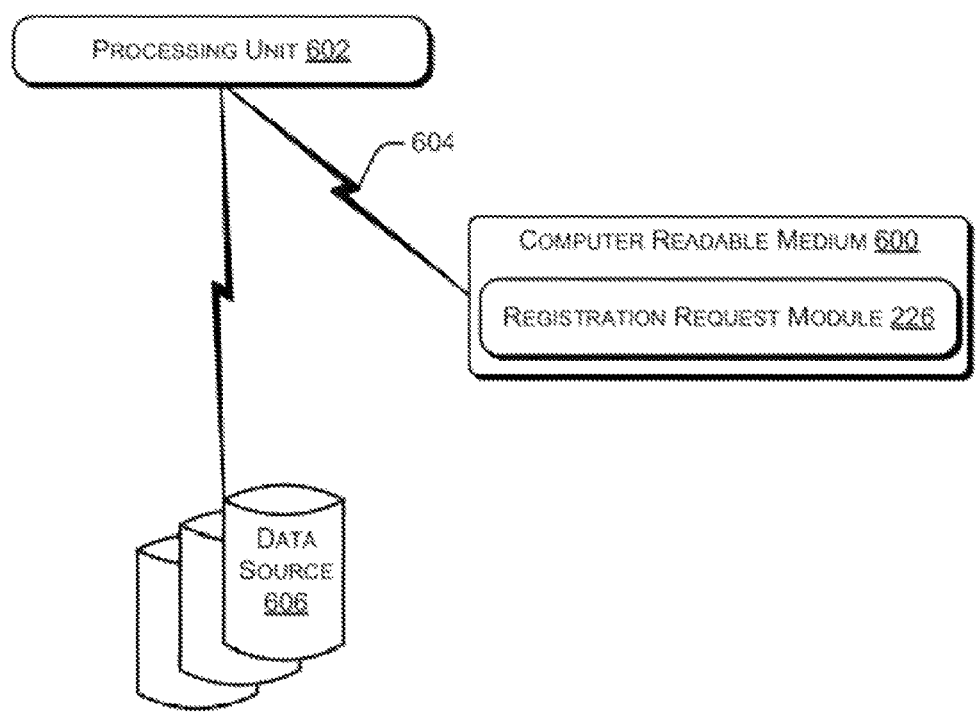
FIG. 6 illustrates a computer readable medium storing instructions for network printing, according to an example of the present subject matter.

FIG. 6 illustrates a computer readable medium 600 storing instructions for network printing, according to an example of the present subject matter. In one example, the computer readable medium 600 is communicatively coupled to a processing unit 602 over communication link 604.

For example, the processing unit 602 can be a computing device, such as a server, a laptop, a desktop, a mobile device, and the like. The computer readable medium 600 can be, for example, an internal memory device or an external memory device or any commercially available non transitory computer readable medium. In one implementation, the communication link 604 may be a direct communication link, such as any memory read/write interface. In another implementation, the communication link 604 may be an indirect communication link, such as a network interface. In such a case, the processing unit 602 can access the computer readable medium 600 through a network.

The processing unit 602 and the computer readable medium 600 may also be communicatively coupled to data sources 606 over the network. The data sources 606 can include, for example, databases and computing devices. The data sources 606 may be used by the requesters and the agents to communicate with the processing unit 602.

In one implementation, the computer readable medium 600 includes a set of computer readable instructions, such as the registration request module 226. The set of computer readable instructions can be accessed by the processing unit 602 through the communication link 604 and subsequently executed to perform acts for network printing.

On execution by the processing unit 602, the registration request module 226 receives a request from a new node to connect to the printer. The registration request module 226 then determines whether a number of child nodes of the printer has reached a predefined threshold number. On determining the number of child nodes not to have reached the predefined threshold number, the registration request module 226 transmits a connection acknowledgement message to the new node. If the number of child nodes is determined to have reached the predefined threshold number, the registration request module 226 transmits a list of child nodes of the printer, to the new node.

Although implementations for network printing have been described in language specific to structural features and/or methods, it is to be understood that the appended claims are not necessarily limited to the specific features or methods described. Rather, the specific features and methods are disclosed as examples of systems and methods for network printing.

I claim:

1. A method for network printing, the method comprising:
   receiving in a signaling server, a request from a new node to connect to the signaling server, wherein the new node is a printer;
   determining whether a number of child nodes of the signaling server has reached a predefined threshold number;
   transmitting a connection acknowledgement message to the node when the number of child nodes is less than the predefined threshold number;
   transmitting a list of child nodes of the signaling server to the new node on determining the number of child nodes has reached the predefined threshold number, wherein the signaling server and the child nodes form a portion of a tree of nodes, and wherein receiving the list of child nodes from the signaling server causes the new node to attempt to establish connections with nodes in the tree of nodes until a node accepts a connection from the new node;
   recording, in a data structure representing the tree of nodes, information describing the new node and information describing the connection between the new node and the node that accepted the connection from the new node;
   receiving a request from a print server to connect to the new node for execution of a print job; and
   route, based on the data structure representing the tree of nodes, the request to the new node to control the new node to connect to the print server and execute the print job.

2. A printer for network printing, the printer comprising:
   a processor;
   a registration request module, coupled to the processor, to:
      transmit a connection request to a parent node of a tree of nodes;
      receive at least one of a connection acknowledgement message and a list of child nodes of the parent node, as a response to the connection request;
      establish a connection with the parent node if the connection acknowledgement message is received;
      transmit the connection request to at least one of the child nodes, of the parent node, if the connection acknowledgement message is not received; and
      upon establishing a connection to a node in the tree of nodes, transmitting a signal to a signaling server in the tree of nodes to cause the signaling server to update data describing the tree of nodes with data describing the connection between the printer and the node in the tree of nodes; and
   a connection maintenance module to:
      receive a connection request, routed based on the data describing the tree of nodes to connect, to a print server to execute a print job;
      establish a connection with the print server;
      receive the print job;
      execute the print job; and
      terminate the connection with print server on completion of the execution.

3. The printer as claimed in claim 2, wherein the registration request module further receives a list of peer nodes of the parent node.

4. The printer as claimed in claim 3, wherein the connection maintenance module is further to:
   sort the list of peer nodes in an ascending order of geographical distance from the printer;
   transmitting a connection request to at least one of the peer nodes, based on the sorting, on detecting a connection break with the parent node.

5. The printer as claimed in claim 2, wherein the connection maintenance module is further to:
   receive a request from a new node to connect to the printer;
   determine whether a number of child nodes of the printer has reached a predefined threshold number; and
   transmit a connection acknowledgement message to the new node on determining the number of child nodes not to have reached the predefined threshold number.

6. The printer as claimed in claim 5, wherein the connection maintenance module further transmits a list of peer nodes of the printer to the new node, wherein the new node connects to at least one of the peer nodes on detecting a break in connection with printer.

7. The printer as claimed in claim 5, wherein the connection maintenance module further transmits a list of child nodes of the printer to the new node, on determining the number of child nodes to have reached the predefined threshold number.

8. A non-transitory computer-readable medium having a set of computer readable instructions that, when executed, cause a printer to:
   receive a request from a new node to connect to the printer;
   determine whether a number of child nodes of the printer has ached a predefined threshold number;
   transmit a connection acknowledgement message to the new node on determining the number of child nodes not to have reached the predefined threshold number;
   transmit a list of child nodes, of the printer, the new node on determining the number of child nodes to have reached the predefined threshold number;
   receiving a request from a print server to connect to the new node for execution of a print job; and
   route the request to the new node to control the new node to connect to the print server and execute the print job.

9. The non-transitory computer-readable medium as claimed in claim 8, wherein the instructions executed further cause the printing system to:
   transmit a connection request to a parent node;
   receive at least one of a connection acknowledgement message and a list of child nodes, of the parent node, as a response to the connection request;
   establish a connection with the parent node on receiving the connection acknowledgement message;
   transmit the connection request to at least one of the child nodes, of the parent node, on not receiving the connection acknowledgement message;

receive a connection request to connect to a print server to execute a print job;
establishes a connection with the print server;
receives the print job; and
executes the print job.

\* \* \* \* \*